United States Patent [19]
Brown et al.

[11] 3,809,962
[45] May 7, 1974

[54] GROUND CURRENT POWERED GROUND FAULT PROTECTOR

[75] Inventors: William Keith Brown; Harris I. Stanback, both of Lexington, Ky.

[73] Assignee: Square D. Company, Park Ridge, Ill.

[22] Filed: Apr. 13, 1973

[21] Appl. No.: 351,068

Related U.S. Application Data

[63] Continuation of Ser. No. 224,107, Feb. 7, 1972, abandoned.

[52] U.S. Cl. .......... 317/18 D, 317/27 R, 317/33 SC, 317/38, 317/50
[51] Int. Cl. ............................................. H02h 3/26
[58] Field of Search .......... 317/18 D, 27 R, 36 TD, 317/33 SC, 38, 5 D; 323/75 E, 40; 321/12, 16, 5

[56] References Cited
UNITED STATES PATENTS

| | | | |
|---|---|---|---|
| 3,512,045 | 5/1970 | Tipton | 317/18 D |
| 3,539,866 | 11/1970 | Stevenson | 317/18 D |
| 3,539,865 | 11/1970 | Billings | 317/38 |

FOREIGN PATENTS OR APPLICATIONS

| | | | |
|---|---|---|---|
| 936,492 | 9/1963 | Great Britain | 321/12 |
| 967,600 | 8/1964 | Great Britain | 321/16 |

*Primary Examiner*—James D. Trammell
*Attorney, Agent, or Firm*—H. J. Rathbun; P. J. Rose

[57] ABSTRACT

An equipment protection system uses a differential transformer to detect ground faults and energizes a shunt trip coil of a circuit breaker solely with energy induced in secondary windings of the differential transformer by the fault current. Uniform time delay is provided regardless of the magnitude of the fault current and means are provided to prevent partial timing out of the time delay circuit at fault currents below the minimum tripping point. The system provides instantaneous tripping of the circuit breaker upon occurrence of large ground fault currents. A switching triac avalanches into conduction upon occurrence of a relatively large ground fault current to protect circuit components from damage while still permitting energization of the shunt trip coil.

13 Claims, 1 Drawing Figure

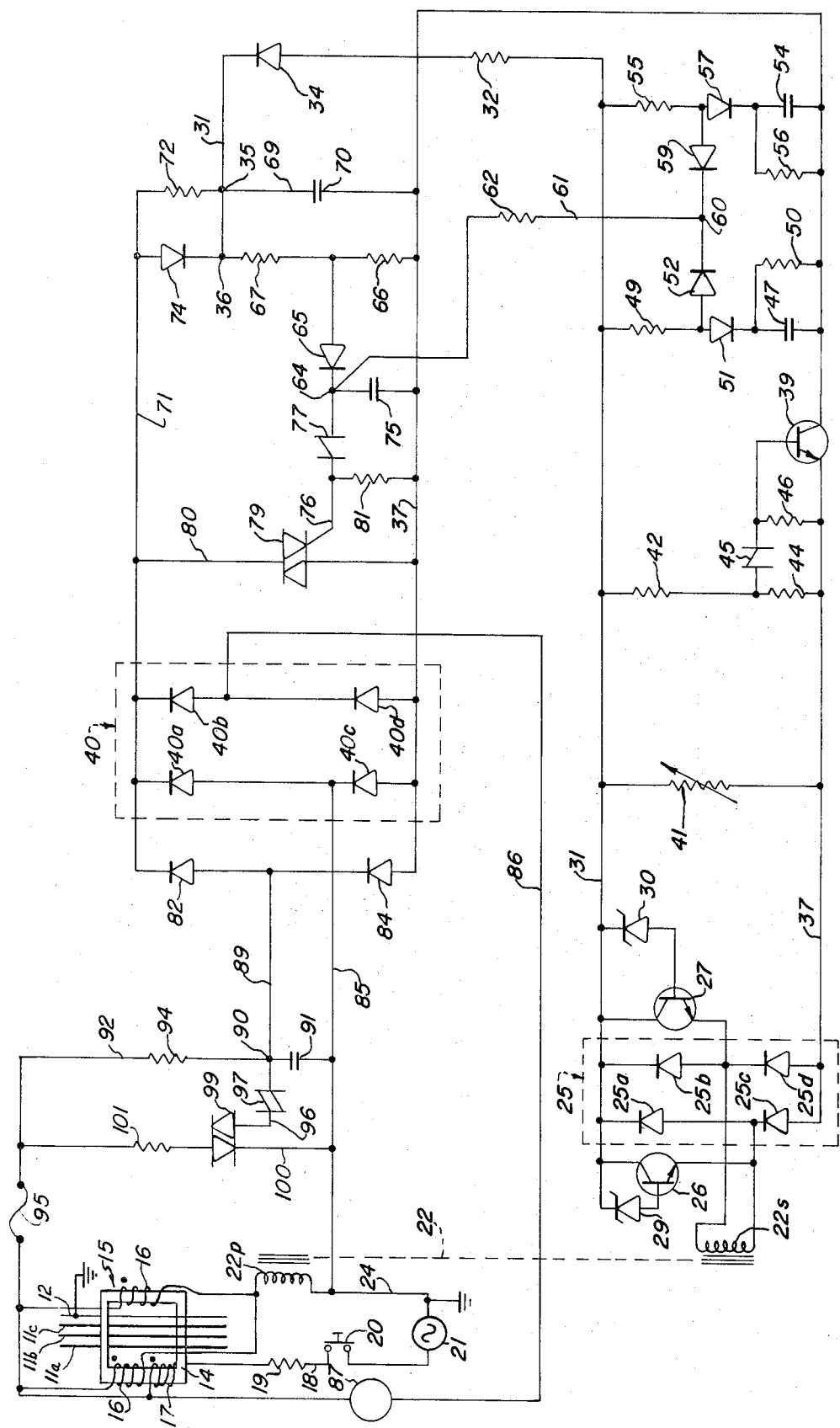

GROUND CURRENT POWERED GROUND FAULT PROTECTOR

This is a continuation of application Ser. No. 224,107, filed Feb. 7, 1972, now abandoned.

This invention relates to ground fault protection and more specifically to a system which provides ground fault protection for equipment and is capable of protecting against high current faults and low current faults while providing a time delay to prevent nuisance tripping caused by self-clearing faults of short duration.

It is an object of this invention to provide an improved ground fault protection system for power distribution systems.

It is a further object to provide a ground fault protection system which requires no external power supply for the tripping operation.

A still further object is to provide a ground fault protection system which exhibits finite time delays at a ground fault current greater than a minimum value, which will not partially time out at any lower value of ground fault current, and which includes means to override the time delay upon occurrence of a very large ground fault current.

Another object is to provide a ground fault protection system which is highly reliable, utilizes redundant timing and voltage regulating circuits, and includes an ultimate backup protection in case of system failure.

Other objects and advantages of the invention will be readily apparent to those skilled in the art from the specification and appended drawing illustrating a preferred embodiment, in which a schematic wiring diagram of a ground fault protection system incorporating the present invention is shown.

In the drawing, a plurality of power conductors 11a, 11b, 11c and a grounded neutral conductor 12 are connected between a three-phase alternating current source (not shown) and a load (not shown) to provide operating power for the load. The conductors 11a, 11b, 11c and 12 are passed through an opening in a rectangular core 14 of a sensor or differential transformer 15, thus forming single turn primary windings of the differential transformer 15. Although the circuit of this invention is illustrated in conjunction with a three-phase power supply, it will be understood by those skilled in the art that the same circuit may be used to provide ground fault protection for a single-phase power distribution system.

The differential transformer 15 has a pair of multi-turn secondary windings 16, preferable having equal numbers of turns, wound, respectively, on legs of the core 14 and connected in parallel with each other to provide highly accurate measurement of fault current levels without the added expense and difficulty required by using a toroid with a single winding surrounding the entire core. This arrangement also provides backup protection should one of the windings 16 be open circuited. However, the ground fault protection system will function with only one secondary winding 16 or with the windings 16 connected in series. An auxiliary primary winding or test winding 17 is connected at one end to one end of the parallel connected secondary windings 16 and at the other end by a conductor 18 through a resistor 19 and a push-to-test switch 20 to one side of an alternating current source 21.

A primary winding 22p of a transformer 22 is connected by a conductor 24 between the other end of the differential transformer secondary windings 16 and the other or a grounded side of the source 21. The transformer 22 has a secondary winding 22s which is connected across the input terminals of a diode bridge rectifier 25 comprising diodes 25a, 25b, 25c and 25d which are connected to have a positive output terminal at the junction of diodes 25a and 25b and a negative output terminal at the junction of diodes 25c and 25d.

A transistor 26 is connected between the positive output terminal of the rectifier bridge 25 and one side of the transformer secondary winding 22s in parallel with the diode 25a and a transistor 27 is connected between the positive output terminal of the diode bridge 25 and the other side of the transformer secondary winding 22s in parallel with the diode 25b. A pair of Zener diodes 29 and 30 are connected between the positive output terminal of the rectifier bridge 25 and the bases of the transistors 26 and 27, respectively. The Zener diodes 29 and 30 are connected so as to be back biased by the positive output voltage of the rectifier bridge 25. The transistors 26 and 27 and Zener diodes 29 and 30 provide voltage regulation for the rectified output of the rectifier bridge 25.

A conductor 31 is connected from the positive output terminal of the rectifier bridge 25 through a resistor 32, a diode 34 and a junction 35 to a junction 36. A conductor 37 is connected from the negative output terminal of the rectifier bridge 25 through the emitter-collector circuit of a transistor 39 to a negative output terminal of a rectifier bridge 40.

A variable resistor 41 is connected between the conductors 31 and 37 to regulate the output voltage of the rectifier bridge 25. This signal is applied across a voltage divider comprising a resistor 42 and a resistor 44. A threshold device, such as a unidirectional trigger 45, is connected from a junction between the resistors 42 and 44 to the base of the transistor 39. A resistor 46 is connected between the trigger 45 and the conductor 37.

A first time delay circuit comprising a capacitor 47, resistors 49 and 50, and diodes 51 and 52, and a second time delay circuit comprising a capacitor 54, resistors 55 and 56, and diodes 57 and 59 are connected in parallel between the conductors 31 and 37. A junction 60 between the diodes 52 and 59 is connected by a conductor 61 through a resistor 62 to a junction 64.

The junction 64 is connected through a diode 65 to a junction between a resistor 66, which is in turn connected to the conductor 37, and a resistor 67, which is in turn connected to the junction 36. The resistors 66 and 67 form a voltage divider.

The junction 35 is connected by a conductor 69 through a capacitor 70 to the conductor 37. A conductor 71 connects the junction 35 through a resistor 72 to a positive output terminal of the rectifier bridge 40. A diode 74 is connected between the junction 36 and the conductor 71.

The junction 64 is connected by a capacitor 75 to the conductor 37 and by a conductor 76 through a threshold device or trigger 77 to the gate of a switching means such as a triac 79 having main terminals which are connected between the conductor 37 and the conductor 71 by a conductor 80. A resistor 81 is connected between the trigger 77 and the conductor 37.

The rectifier bridge 40 comprises diodes 40a, 40b, 40c and 40d, the junction of diodes 40a and 40b forming the positive output terminal and the junction of diodes 40c and 40d forming the negative output terminal. A pair of diodes 82 and 84 are serially connected between the positive and negative output terminals of the rectifier bridge 40 and poled in the same direction as the diodes thereof.

A conductor 85 connects an input terminal of the rectifier bridge 40 to the grounded side of the transformer primary winding 22p. A conductor 86 connects another input terminal of the rectifier bridge 40 through a shunt trip coil 87 of a circuit breaker to the common ends of the windings 16 and 17 of the differential transformer 15. The circuit breaker includes contacts (not shown) for interrupting the flow of power to the load upon occurrence of a ground fault. These contacts may be located on either the line or load side of the differential transformer 15.

A conductor 89 connects a junction between the diodes 82 and 84 to a junction 90. The junction 90 is connected by a capacitor 91 to the conductor 85, by a conductor 92 through a resistor 94 and a backup means or fuse 95 to the common end of the differential transformer secondary windings 16, and by a conductor 96 through a bidirectional threshold device or trigger 97 to the gate of a triac 99. The main terminals of the triac 99 are connected by a conductor 100 to the conductor 85 and, through a resistor 101, to the conductor 92 between the resistor 94 and fuse 95.

The operation of the system will now be described. When there is no ground fault on the load side of the differential transformer 15, the currents flowing through the conductors 11a, 11b, 11c and 12 are equal and balanced so that the net magnetization of the core 14 of the differential transformer 15 is zero, as is well known to those skilled in the art. Since no external power supply is utilized for tripping operation of the ground fault protection system of this invention, zero current then is applied to the system.

Should a high impedance ground fault occur at the load, or at a point on the conductors 11a, 11b, and 11c between the differential transformer 15 and the load, which will cause a ground fault current too small to cause damage to the protected load circuit, the resulting unbalanced current through the conductors 11a, 11b, 11c and 12 will cause an output of the sensor 15 by inducing a current in the secondary windings 16 which will energize the transformer primary winding 22p through a circuit comprising the differential transformer secondary windings 16, the fuse 95, the conductor 92, the resistor 94, the junction 90, the capacitor 91, the conductor 85 and the transformer primary winding 22p. The resistor 94 and capacitor 91 are chosen to provide a high impedance path so that when the ground fault current is low, power dissipation through the ground fault protection system is also low. As the ground fault current increases, however, the voltage at the junction 90 increases to the threshold or switching voltage of the trigger 97 to fire the triac 99 at a preset value of fault current and place a low impedance, comprising the triac 99, the resistor 101 and the winding 22p, across the differential transformer secondary windings 16.

The increased current thereby flowing through the transformer primary winding 22p induces a larger voltage in the transformer secondary winding 22s which is in turn applied to the input terminals of the rectifier bridge 25. The direct current output voltage of the rectifier bridge 25 is directly proportional to its input voltage so that a high current ground fault could result in damage to the circuit components energized by the rectifier bridge 25. Also, it is desirable to operate the time delay circuits with a constant voltage regardless of the magnitude of the fault current. Therefore, the voltage regulating means comprising the transistors 26 and 27 and the Zener diodes 29 and 30 is provided.

Since each transistor and diode pair performs its voltage regulating function on alternate half cycles of the alternating current output of the transformer secondary winding 22s, operation of the voltage regulating means will be described for only one polarity of voltage output of the secondary winding 22s. The Zener diodes 29 and 30 are preferably chosen to conduct when the back biasing voltage is at a predetermined level which will ensure safe operation of the components of the ground fault protection circuit. If, for the purposes of this description, the junction between the diodes 25a and 25c is considered to be positive, current will flow from the secondary winding 22s through the diode 25a, the conductor 31, the circuit components to be energized by the rectifier bridge 25, the conductor 37 and the diode 25d back to the secondary winding 22s. If the magnitude of the ground fault current causes an excessive voltage to be produced across the output terminals of the rectifier bridge 25, the back biasing voltage across the Zener diode 30 and the base-emitter circuit of the transistor 27 will cause the Zener diode 30 to start to conduct. A biasing current is thus applied to the base-emitter circuit of the transistor 27 causing it to conduct and thereby limit the voltage output of the rectifier bridge 25. Should the input voltage increase, the base biasing current of the transistor 27 will also increase so that the output voltage of the rectifier bridge 25 is maintained at the desired value.

The combination of the transistor 26 and the Zener diode 29 is connected across the diode 25a. Because of the polarity of the winding 22s, the diode 25a short circuits this transistor-Zener diode combination so that it does not function during this half cycle of alternating current. It will be clear to those skilled in the art that when the polarity of the voltage across the transformer secondary winding 22s is reversed during the other half cycle of alternating current, the Zener diode 29 and the transistor 26 perform the voltage regulating function.

The output voltage from the rectifier bridge 25 is applied through the conductors 31 and 37 across the voltage divider formed by the resistors 42 and 44 and across the variable resistor 41, which may be adjusted to determine the voltage which will be applied across the resistors 42 and 44 for a particular value of ground fault current. When the voltage output of the rectifier bridge 25 is sufficiently great, corresponding to a fault current determined by the setting of the variable resistor 41, the trigger 45 breaks over into conduction turning on the switching transistor 39. The resistor 46 provides a shunt path across the base-emitter circuit of the transistor 39 for the current which flows through the trigger 45 just prior to reaching the switching point and thus ensures a distinct switching action for the transistor 39. It should be clear from this description that the setting of the variable resistor 41 determines the minimum fault current for which the circuit will provide protection.

After the transistor 39 is biased into conduction, or switched on, a voltage is simultaneously placed across the capacitors 47 and 54 and timing starts. As long as the fault current can provide a sufficient voltage across the voltage divider of resistors 42 and 44, the transistor 39 will conduct for a portion of each half cycle of rectified voltage. If the fault current drops below this level, the transistor 39 turns off, the capacitors 47 and 54 discharge through the high ohmic value resistors 50 and 56, respectively, and timing ends so that the circuit is reset to its initial condition to prevent nuisance tripping on self-clearing faults.

The capacitor 47 is charged through the resistor 49 and the diode 51. The capacitor 54 is charged through the resistor 55 and the diode 57. The diodes 51 and 57 limit charge loss from the capacitors when the applied voltage goes to zero, requiring discharge through the resistors 50 and 56, respectively. The redundant time delay means are provided to enhance the safety of the ground fault protection system. If any one resistor 49 or 55 short or opens or any one capacitor 47 or 54 shorts or opens, the circuit will continue to provide protection with essentially the same time delay.

The voltage on the timing capacitors 47 and 54 also appears on the capacitor 75 through a circuit comprising the conductor 31, the parallel connected resistors 49 and 55 and diodes 52 and 59, the conductor 61, the resistor 62, the junction 64, the capacitor 75 and the conductor 37. At the same time, the capacitor 70 is charged through a circuit comprising the conductor 31, the resistor 32, the diode 34, the junction 35, the conductor 69, the capacitor 70, the conductor 37 and the transistor 39.

When the charge on the capacitor 75 builds up to the threshold voltage of the trigger 77, the trigger 77 breaks over into conduction and the capacitor 75 applies a current pulse to the gate of the triac 79 to turn it on. The resistor 81 is included in the circuit to provide some noise immunity just prior to the switching point of the trigger 77 so that repeatable time delays before the turning on of the triac 79 are assured.

The biasing of the triac 79 into conduction places an extremely low impedance path across the capacitor 91 through a path comprising the junction 90, the conductor 89, the diode 82, the conductors 71 and 80, the triac 79, the conductor 37, the diode 40c and the conductor 85, and alternatively through a path comprising the conductor 85, the diode 40a, the conductors 71 and 80, the triac 79, the conductor 37, the diode 84, the conductor 89 and the junction 90. The voltage at the junction 90 is diminished and the triac 99 turns off. This switches the output of the differential transformer secondary windings 16 from a path through the resistor 101 and the triac 99 to parallel paths through the resistor 94 and the shunt trip coil 87. Current passes through the resistor 94 through a path from the differential transformer secondary windings 16 through the fuse 95, the conductor 92, the resistor 94, the junction 90, the conductor 89, the diode 82, the conductor 71, the conductor 80, the triac 79, the conductor 37, the diode 40c and the conductor 85 to the transformer primary winding 22p. On alternate half cycles the path is from the secondary windings 16 through the diodes 40a and 84.

It should be noted that the switching action of the triac 99 enables the ground fault protector to operate even at low fault levels on the order of 200 amperes. In its conducting condition, the triac 99 sends virtually all of the output power of the transformer 15 into the timing circuit on occurrence of a low or medium fault. Then the triac 99 is turned off so that nearly all of the output power of the transformer 15 is available and is used to energize the trip coil 87. Otherwise, there might not be enough power to clear a low current fault.

The shunt trip coil 87 is energized through a path from the secondary windings 16 through the shunt trip coil 87, the conductor 86, the diode 40b, the conductors 71 and 80, the triac 79, the conductor 37, the diode 40c and the conductor 85 to the transformer primary winding 22p. On alternate half cycles the shunt trip coil 87 is energized through the diodes 40a and 40d.

The triac 79 will not remain in a conducting condition unless the current passing therethrough reaches the latching current for the triac. Since a finite time period is required to increase the current through the shunt trip coil 87 from zero to the latching current of the triac 79 and since the capacitor 75 discharges before this time period has passed, the latching current for the triac 79 is supplied by the capacitor 70 through a circuit comprising the capacitor 70, the conductor 69, the junction 35, the resistor 72, the conductors 71 and 80, the triac 79 and the conductor 37. This current is supplied for a time sufficient for the currents through the shunt trip coil 87 and the resistor 94 to reach sufficient magnitude to cause the triac 79 to latch on. When the shunt trip coil 87 is energized, it opens the contacts interposed in the power conductors 11a, 11b, and 11c and thus turns off power to the load.

If the ground fault current is of sufficient magnitude to damage the load before the timing period is over, it is desirable to bypass the time delay circuit and energize the shunt trip coil 87 instantly, i.e., without purposefully introduced time delay, upon occurrence of the ground fault.

During the time the triac 99 is conducting, as when there is a low current ground fault between the differential transformer 15 and the protected load circuit, a voltage directly related to the fault current appears across the series combination of the resistor 101 and triac 99. This voltage is applied through the fuse 95, shunt trip coil 87, the rectifier bridge 40, the conductors 37 and 71 and the diode 74 across the capacitor 70 and the voltage divider comprising the resistors 66 and 67. When the fault current reaches a preselected level, the voltage across the resistor 66 becomes equal to the threshold voltage of the trigger 77 and is applied to the gate of the triac 79 through the diode 65. This causes the triac 79 to conduct to energize the shunt trip coil as previously described. In this manner, a nearly instantaneous trip at a fault current level determined by the relative ohmic values of the resistors 66 and 67 is provided.

As is known to those skilled in the art, a triac will avalanche into conduction when the voltage across its main terminals reaches the characteristic avalanche value for the triac. Because of this, upon occurrence of a very high current ground fault, even when the triac 99 has not been turned on by the application of a sufficient gate biasing voltage, the triac 99 will avalanche into conduction. This avalanching operation of the triac 99 provides a shunt circuit to protect the differential transformer secondary windings 16 and the shunt trip coil 87 from excessively high voltages that might puncture their insulation.

If, due to failure of any of the components of the circuit, the shunt trip coil 87 fails to become energized during a high current fault of long duration, the fuse 95 will blow, open-circuiting the switching triac 99 and related circuitry, whereupon the output of the differential transformer secondary windings 16 will be applied through the shunt trip coil 87, the rectifier bridge 40 and the transformer primary winding 22p across the triac 79 and the voltage divider comprising the resistors 66 and 67. If the voltage is above the characteristic avalanching voltage for the triac 79, the triac will avalanche into conduction. If it is less than this value and yet sufficient to cause the blowing of the fuse 95, it will place a voltage across the resistor 66 which is sufficient to break over the trigger 77 and gate the triac 79 on. In this manner, upon the blowing of the fuse 95, the shunt trip coil 87 will be instantly energized through the rectifier bridge 40 and the triac 79.

A test circuit is provided for the ground fault protection system and comprises the test winding 17, the resistor 19, the push-to-test switch 20, and the alternating current source 21. Were the test circuit to be used only when the conductors 11a, 11b and 11c are de-energized, a conventional test circuit could be used; that is, a test winding could be wound on the core of the transformer 15 and arranged to be connected directly across an alternating current source to provide the test current by simple transformer action. It would then only be necessary for the turns ratio of the windings on the core 15 to be such that the current in the windings 16 caused by energization of the test winding would be sufficient to operate the ground fault protector.

Because it is often inconvenient and costly to de-energize the protected load circuits, the test circuit of the present invention is designed and arranged so that testing can be performed while the protected load circuits are energized. Thus it is necessary that the test circuit effect tripping even if there is a ground fault current in the protected load circuits. This fault current can be directly out of phase with the test current and of a value just under that which would cause the ground fault protector to energize the trip coil 87. This requires that the test circuit be capable of causing sufficient current to flow in the windings 16 to overcome the effect of the out-of-phase ground fault current. For example, if the variable resistor 41 is set to provide operation of the ground fault protector upon occurrence of a ground fault current of 1,200 amperes, it is necessary for the test winding 17 to cause a current to flow in the windings 16 equivalent to that which would be produced by a ground fault current of 2,400 amperes. This will permit tripping operation to be effected by the test circuit even if a ground fault current exists in the protected load circuits which is directly out of phase with the test current and of a value just under 1,200 amperes. For a conventionally connected test circuit to so operate, a relatively large current would have to be drawn from the source 21, and since the source is usually in the form of a single phase transformer, an expensive transformer of large capacity would be required although used only during a test operation.

The test circuit of this invention provides the required energization of the windings 16 without a large current output from the source 21. Because of the serial connection of the test winding 17 with the windings 16, the current through the windings 16 and the winding 22p is the sum of two separate currents. One of the separate currents is derived by transformer action from the winding 17 and flows through the loop comprising the windings 16, the transformer primary winding 22p, the conductors 85 and 100, the triac 99, the resistor 101 and the fuse 95. This current is combined in the windings 16 and 22p with the current directly supplied from the source 21 through the push-to-test switch 20, the resistor 19, the test winding 17, the secondary windings 16 and the winding 22p. The combination of these currents is sufficient for test purposes without requiring a high current output from the source 21, as would be required by a conventional test circuit. However, the serial connection of the test winding 17 and the secondary windings 16 causes the voltages across these windings to be combined and could produce a dangerous voltage level at the push-to-test switch 20. Therefore, the windings 16 and 17 have been poled as indicated in the FIGURE so that the voltage across the windings 16 "bucks" the voltage across the winding 17 and a relatively low voltage level is maintained across the push-to-test switch 20. The resistor 19 is necessary to limit the current from the source 21 because the bucking connections of the windings 16 and 17 results in a relatively low impedance.

We claim:

1. A protective circuit for controlling disconnecting means for a plurality of electrical conductors supplying alternating current to a load, said circuit comprising sensor means for detecting unbalanced current in said conductors and having an output directly related to the magnitude of said unbalanced current, operating means energized solely by the output of said sensor means for operating said disconnecting means in response to a predetermined magnitude of said unbalanced current, time delay means delaying energization of said operating means by the output of said sensor means for a time interval after said unbalanced current reaches said predetermined magnitude, and means effective when said unbalanced current reaches said predetermined magnitude to initiate timing by said time delay means for said time interval.

2. A protective circuit as in claim 1 and including means to bypass said time delay means and cause said operating means to be energized substantially without time delay when the output of said sensor means exceeds a predetermined value greater than said predetermined magnitude.

3. A protective circuit as in claim 1 wherein the output of said sensor means is an alternating voltage and including rectifier means for rectifying the output voltage of said sensor means and supplying the rectified voltage to said time delay means and said operating means, said rectifier means including regulating means for maintaining the output voltage of said rectifier means at a value not greater than a preselected value.

4. A protective circuit for controlling disconnecting means for a plurality of electrical conductors supplying alternating current to a load, said circuit comprising sensor means for detecting unbalanced current in said conductors and having an alternating output voltage directly related to the magnitude of said unbalanced current, operating means energized solely by the output of said sensor means for operating said disconnecting means in response to a predetermined magnitude of said unbalanced current, time delay means delaying energization of said operating means by the output of said sensor means for a time interval after said unbalanced current reaches said predetermined magnitude, rectifier means for rectifying the output voltage of said sensor means and supplying the rectified voltage to said time delay means and said operating means, said rectifier means including a pair of input terminals and a pair of output terminals, and regulating means for maintaining the output voltage of said rectifier means at a value not greater than a preselected value, said regulating means including a first transistor means connected between one of said output terminals and one of said input terminals and having a base, a second transistor means connected between said one output terminal and the other of said input terminals and having a base, a first threshold means connected between said one output terminal and the base of the first transistor means, and a second threshold means connected between said one output terminal and the base of the second transistor means.

5. A protective circuit for controlling disconnecting means for a plurality of electrical conductors supplying alternating current to a load, said circuit comprising sensor means for detecting unbalanced current in said conductors and having an alternating output voltage directly related to the magnitude of said unbalanced current, operating means energized solely by the output of said sensor means for operating said disconnecting means in response to a predetermined magnitude of said unbalanced current, time delay means delaying energization of said operating means by the output of said sensor means for a time interval after said unbalanced current reaches said predetermined magnitude, rectifier means for rectifying the output voltage of said sensor means and supplying the rectified voltage to said time delay means and said operating means, and regulating means for maintaining the output voltage of said rectifier means at a value not greater than a preselected value, said time delay means including a first capacitor and a second capacitor each connected to be charged by the output voltage of said rectifier means, a first rectifier connected between the first capacitor and said operating means, and a second rectifier connected between the second capacitor and said operating means, whereby each of the first and second capacitors independently delays energization of said operating means by the output of said sensor means for said time interval.

6. A protective circuit as in claim 1 wherein said operating means comprises a winding means for controlling said disconnecting means, a switching means having a conductive condition causing said winding means to be energized by the output of said sensor means and a non-conductive condition preventing said energization of said winding means, and means controlled by said time delay means for switching the switching means to its conductive condition after said time interval.

7. A protective circuit for controlling disconnecting means for a plurality of electrical conductors supplying alternating current to a load, said circuit comprising sensor means for detecting unbalanced current in said conductors and having an output directly related to the magnitude of said unbalanced current, operating means energized solely by the output of said sensor means for operating said disconnecting means in response to a predetermined magnitude of said unbalanced current, time delay means delaying energization of said operating means by the output of said sensor means for a time interval after said unbalanced current reaches said predetermined magnitude, and switching means having a first operative condition upon occurrence of unbalanced current in said conductors causing the output of said sensor means to be applied to said time delay means, and a second operative condition, upon expiration of said time interval, causing the output of said sensor means to be applied to said operating means.

8. A protective circuit as in claim 7 including means for changing the operative condition of said switching means from said first operative condition to said second operative condition substantially without time delay when the output of said sensor means exceeds a predetermined value greater than said predetermined magnitude.

9. A protective circuit as in claim 7 wherein said operating means includes a winding means for controlling said disconnecting means, an additional switching means having a conductive condition causing said winding means to be energized by the output of said sensor means, and a non-conductive condition preventing said energization of said winding means, and biasing means controlled by said time delay means for switching the additional switching means to its conductive condition after said time interval.

10. A protective circuit as in claim 9 including means for changing the operative condition of said switching means from said first operative condition to said second operative condition substantially without time delay when the output of said sensor means exceeds a predetermined value greater than a predetermined magnitude and wherein said operating means includes an additional biasing means responsive to the output of said sensor means for switching said additional switching means to its conductive condition substantially without time delay.

11. A protective circuit as in claim 1 including backup means serially connected to said sensor means and operative in response to an unbalanced current in said conductors and after a time period greater than said time interval to cause said disconnecting means to be operated in event said disconnecting means has not operated.

12. A protective circuit as in claim 1 wherein said sensor means includes a core magnetically associated with said conductors and a secondary winding, and said protective circuit includes a test winding on said core serially connected between said secondary winding and a source of current and wound so that a voltage across the test winding induces a voltage across the secondary winding in opposition to the voltage across the test winding.

13. A protective circuit for controlling disconnecting means for a plurality of electrical conductors supplying alternating current to a load, said circuit comprising sensor means for detecting unbalanced current in said conductors and having an output directly related to the magnitude of said unbalanced current, a winding means for controlling said disconnecting means and energized in response to a predetermined magnitude of said unbalanced current solely by the output of said sensor means, a first switching means having a conductive condition causing said winding means to be energized by the output of said sensor means and a non-conductive condition preventing said energization of said winding means, biasing means for switching said first switching means to its conductive condition, rectifier means for rectifying an output of said sensor means and having output terminals, regulating means for maintaining the output voltage of said rectifier means at a value not greater than a preselected value, time delay means for operating said biasing means after a time interval and including capacitor means connected across the output terminals of said rectifier means, means operated by a preselected output voltage of said rectifier means to begin said time interval and adjustment means for selecting the preselected output voltage, a second switching means having a first operative condition causing the output of said sensor means to be directed to said time delay means and a second operative condition, upon expiration of said time interval, causing the output of said sensor means to be directed to said first switching means, means for changing the operative condition of said second switching means from said first operative condition to said second operative condition substantially without time delay when the output of said sensor means exceeds a predetermined value greater than said predetermined magnitude, an additional biasing means responsive to the output of said sensor means for switching said first switching means to its conductive condition substantially without time delay, and backup means serially connected to said sensor means and operative in response to an unbalanced current in said conductors and after a time period greater than said time interval to cause said winding means to be energized in event said winding means has not been energized.

* * * * *